Figure 1:
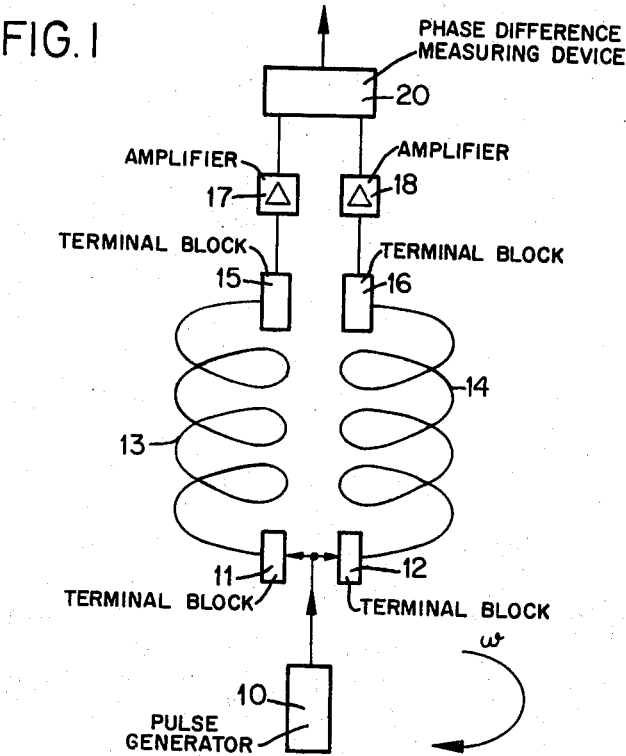

United States Patent
Erben et al.

[15] 3,678,380
[45] July 18, 1972

[54] MEASURING DEVICE FOR USE IN MOVING BODIES FOR NAVIGATION PURPOSES TO DETERMINE THE CHANGE OF ORIENTATION THEREOF

[72] Inventors: Klaus Dieter Erben; Walter Kroy; Walter Erich Mehnert, all of Munich, Germany

[73] Assignee: Messerschmitt-Bolkov-Blohm GmbH, Munich, Germany

[22] Filed: Feb. 9, 1970

[21] Appl. No.: 9,484

[30] Foreign Application Priority Data
Feb. 17, 1969 Germany..................P 19 07 838.7

[52] U.S. Cl..................324/83 A, 235/150.25, 324/71 R
[51] Int. Cl.....................G01r 25/00, H03d 13/00
[58] Field of Search..............324/83 A, 87, 34 SC, 71 R; 235/150.25

[56] References Cited
UNITED STATES PATENTS
| | | | |
|---|---|---|---|
| 3,102,953 | 9/1963 | Wallace | 250/51.5 |
| 3,395,270 | 7/1968 | Speller | 356/106 X |

*Primary Examiner*—Alfred E. Smith
*Attorney*—Woodhams, Blanchard and Flynn

[57] ABSTRACT

Orientation or a change of orientation measuring device for navigation purposes particularly in aircraft and spacecraft. The device utilizes a pair of superconductors wound in coil form connected at one end to a pulse generator and at the other end to a phase difference measuring device. The apparatus utilizes the Sagnac effect derived from the phase difference of the pulses at their output for measuring the orientation or change in orientation of the craft on which the device is carried.

3 Claims, 2 Drawing Figures

PATENTED JUL 18 1972 3,678,380

INVENTORS
KLAUS DIETER ERBEN
WALTER KROY
WALTER ERICH MEHNERT

BY *Woodhams, Blanchard & Flynn*
ATTORNEYS

3,678,380

MEASURING DEVICE FOR USE IN MOVING BODIES FOR NAVIGATION PURPOSES TO DETERMINE THE CHANGE OF ORIENTATION THEREOF

The invention relates to a measuring device for navigation purposes, especially in air and spacecraft, to determine orientation and change of orientation, utilizing the Sagnac effect.

A measuring device has already been suggested in which the sensitivity of a Sagnac interferometer is increased by measuring the interference of a light beam making multiple passages through a Lucite tube. The light beam is caused to make multiple passages in the sense of rotation of the body to be measured and in the opposite sense; in the known devices, this is accomplished in a transparent glass spool; in accordance with other proposed solutions, it takes place in one or more glass fiber spools, using a source of coherent light. The advantages of all these state-of-the-art devices are indisputable, but experience has shown that, above all, thermal differences in the individual spools may cause errors when very accurate measurements are attempted. In extreme cases which are now and then encountered in aeronautical and astronautical applications, still higher measuring accuracy requirements can be met only by the expenditure of very great design effort.

It is therefore the object of the present invention to create a measuring device to determine the orientation and change of orientation of moving bodies, e.g., for navigation of missiles, ships, etc., the measuring sensitivity being considerably improved without increased effort. This is achieved by providing superconductors wound in the form of coils, at one end connected to a pulse generator, at the other end, via wiper contacts and amplifiers, to a phase difference measuring device for measurement of change of orientation.

Another illustrative embodiment of the invention provides that a pulse device be connected to a single superconductor wound like a coil or ring, the pulse input taking place on an adapter of the superconductor, which partially becomes a normal conductor for a short time when a super-critical magnetic field is applied by means of an auxiliary coil. These measures permit, in a surprising way, a considerable improvement in measuring sensitivity without increasing the engineering effort and thus result in a significant increase in measuring accuracy.

Figure 2:
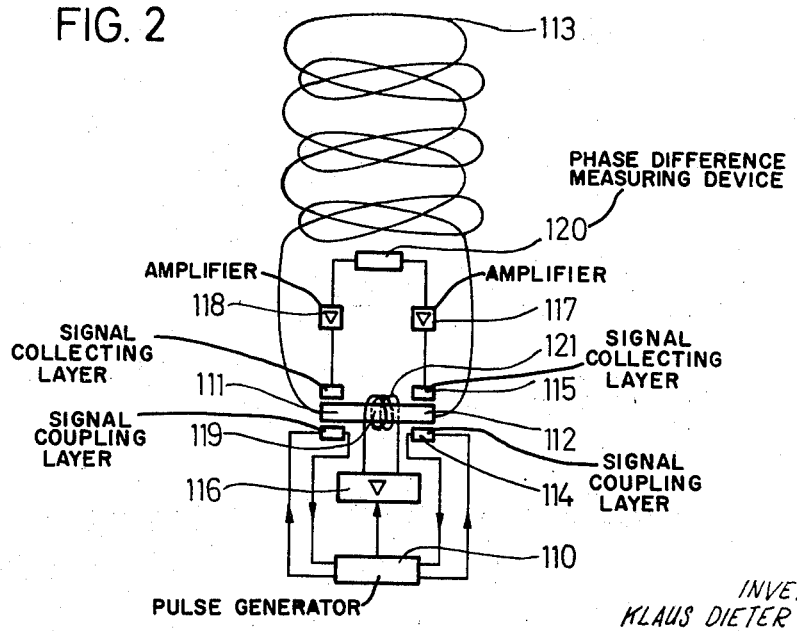

Other additional features and advantages of this invention will become apparent through reference to the following illustrative embodiments and drawings which show:

FIG. 1 is a diagram of a two-coil arrangement;
FIG. 2 is a diagram of a single-coil arrangement.

The embodiment according to FIG. 1 is composed as follows: a pulse generator 10 sends successive current pulses to the inputs 11, 12 of two superconductors 13, 14 wound like coils which are arranged so that the current pulses pass once in the sense of rotation of a platform carrying the overall device — which, in the drawings, is merely symbolized by the angular rate vector $\omega$ — and once opposite to the sense of rotation. The phase difference at outputs 15, 16 between the pulses, after passage through the superconductors 13, 14 is transmitted to a phase difference measuring device 20 by amplifiers 17, 18. The phase difference constitutes the Sagnac effect and is used as a measure of the orientation of change of orientation of the air or spacecraft.

FIG. 2 shows an embodiment of the invention using only one single coil-type superconductor 113. The beginning 111 and the end 112 of the coil are connected with each other via an adapter 119 of the Type I superconductor and thus close the circuit of superconductor coil 113. Pulses are generated by the pulse generator 110 and are induced by means of the signal coupling layer 114 in the ends 111 and 112 of the part 119. In order to make these pulses pass through the single superconductor 113 both in the same sense as that of rotation and in the sense opposite to that of rotation, the part 119 of the Type I superconductor lying between the ends 111 and 112—outside the influence of the coupling layers 114 and the collecting layer 115 and within the zone of influence of an auxiliary coil 121—must have normal conductivity for a short time prior to each pulse. This is achieved by applying a super-critical magnetic field by means of the small auxiliary coil 121. The pulses so induced at the ends 111, 112 are then propagated in the sense opposite to that of rotation. Further details concerning the structure and operation of this part of the apparatus will be found in our copending application, Ser. No. 9,485 filed Feb. 9, 1970. The phase difference is measured in the measuring device 120 via the signal collecting layers 115 after having been amplified by the amplifiers 117, 118 and thus is a measure of the change of orientation. The advantage of the one-coil arrangement is especially the fact that a double length path is achieved because the pulse passes through the entire coil length.

The embodiments of the invention in which an exclusive property or privilege is claimed are defined as follows:

1. A measuring device for use in moving bodies for navigation purposes, particularly in aircraft and spacecraft, to determine the change of orientation thereof, comprising:
   electrical current pulse generator means for generating successive current pulses;
   superconductor coil means having a plurality of turns, one end of said superconductor coil means being connected in electrical circuit with said electrical current pulse generator means, said superconductor coil means defining a pair of current conducting paths extending in opposite directions around the axis of movement of said bodies, said electrical current pulse generator means being adapted to simultaneously transmit said successive current pulses through said pair of current conducting paths;
   a pair of separate amplification circuit means each being connected to one of the other ends of said pair of current conducting paths; and
   phase difference measuring means connected in electrical circuit with each one of said amplification circuit means for measuring the difference in time that the pulses transmitted through said pair of current conducting paths arrive at said phase difference measuring means and thereby indicate the change of orientation of said aircraft and said spacecraft by utilizing the Sagnac effect.

2. A measuring device according to claim 1, wherein said superconductor means comprises a pair of superconductor coils, one end of each of said coils being connected in electrical circuit with said electrical current pulse generator means; and
   wherein said pair of separate amplification circuit means are each connected to the other ends of said pair of superconductor coils.

3. A measuring device according to claim 1, wherein said superconductor means comprises a single superconductor coil having a pair of terminals thereon, said terminals being electrically connected together by means defining an elongated superconductor adapter; and
   including auxiliary coil means associated with said superconductor adapter means and connected in electrical circuit with said electrical current pulse generator means and responsive to the electrical current pulses generated by said electrical current pulse generator means to produce a periodic super-critical magnetic field to periodically render said superconductor adapter means a normal conductor and thereby permit the simultaneous transmission of a pair of pulses in opposite directions through said single coil, said adapter means returning to a superconductor at the completion of a pulse from said electrical current pulse generator means; and
   wherein each of said pair of amplification circuit means is connected in circuit with a respective end of said superconductor adapter means on opposite sides of said auxiliary coil means.

* * * * *